No. 768,987.

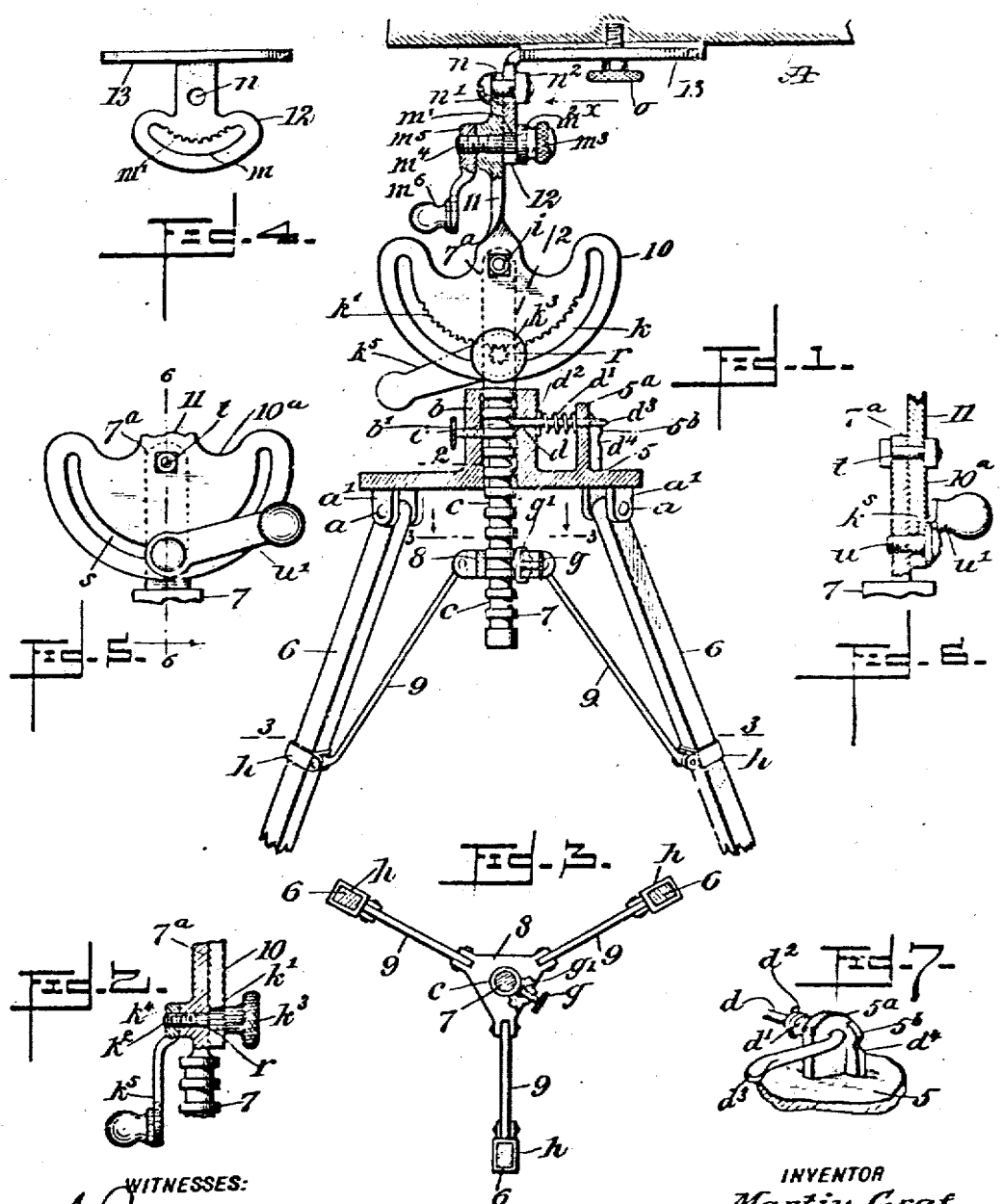

Patented August 30, 1904.

UNITED STATES PATENT OFFICE.

MARTIN GRAF, OF TUCKAHOE, NEW YORK.

CAMERA-SUPPORT.

SPECIFICATION forming part of Letters Patent No. 768,987, dated August 30, 1904.

Application filed January 13, 1904. Serial No. 188,845. (No model.)

*To all whom it may concern:*

Be it known that I, MARTIN GRAF, a citizen of the United States, and a resident of Tuckahoe, in the county of Westchester and State of New York, have invented a new and Improved Camera-Support, of which the following is a full, clear, and exact description.

This invention relates to means for adjustably supporting a camera upon a tripod, and has for its object to provide novel details of construction for a camera-support which are simple, practical, and inexpensive, affording convenient means for quickly and reliably adjusting parts of the same to spread apart and hold the legs of a tripod at a desired degree of divergence and also enable the accurate adjustment of details of the improvement for elevating, depressing, or leveling the body of a camera as may be necessary for its proper use.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a partly-sectional side elevation of the improvement mounted upon an upper portion of a tripod and supporting a camera, partially shown. Fig. 2 is a vertical transverse sectional view substantially on the line 2 2 in Fig. 1. Fig. 3 is a partly-sectional plan view of the details substantially on the line 3 3 in Fig. 1. Fig. 4 is a detached side view of a bracket employed, seen in the direction of the arrow $x$ in Fig. 1. Fig. 5 is a fragmentary side view of a detail of the invention, showing a modified construction therefor. Fig. 6 is a vertical transverse sectional view substantially on the line 6 6 in Fig. 5, and Fig. 7 is a perspective view of a spring-pressed latching device employed to permit rotatable movement of the camera on a tripod at a desired height.

The supporting-tripod for a camera which embodies details of the invention comprises a head-plate 5 and three legs 6, that are jointed upon the lower side of the head-plate by the pivots $a$, that pass through the upper ends of the legs, and likewise engage ears or similar projections $a'$, formed on said plate, as indicated in Fig. 1 for two of the legs. From the center of the preferably circular and flat head-plate 5 a boss $b$ is erected that is centrally and vertically perforated, and in said perforation a shaft 7 is loosely fitted. The shaft 7 for a portion of its length extending from the lower end upward is rendered cylindrical, this portion having slidable engagement within the perforation of the boss $b$, and at preferably equal distances apart a number of annular grooves $c$ are formed therein, the series extending from the upper flattened portion $7^a$ of the shaft to the lower end, as indicated in Fig. 1. At one side of the boss $b$ and suitably spaced therefrom a guide-flange $5^a$ is erected on the head-plate 5. In the same horizontal plane a single perforation is formed in the guide-flange $5^a$ and side wall of the boss $b$, these alined perforations receiving the loosely-fitted locking-bolt $d$, that is adapted to engage its end that may pass through the boss within any one of the grooves $c$. A spring $d'$ is mounted on the bolt $d$ between the boss $b$ and upstanding flange $5^a$, said spring pressing upon a projection $d^2$ on the bolt at the end of the spring that is nearest to the boss and at the other end thereof upon the flange which adapts said spring to force the bolt inward.

Upon the projecting outer end of the locking-bolt $d$ a handle-lever $d^3$ is formed or secured, which projects laterally therefrom, and upon the outer side of the guide-flange $5^a$ a cam-shaped lug or projection $5^b$ is formed, that the handle-lever $d^3$ will ride upon when said lever is turned toward the cam. It will be seen that the degree of projection of the cam formation $5^b$ is such that when the lever $d^3$ rides thereon the locking-bolt $d$ will be drawn outward sufficiently to release the inner end of said bolt from a groove $c$ in the shaft 7 it may have been bedded in, which will permit the shaft to receive vertical adjustment in the boss $b$, so as to elevate or depress said shaft. In the lug having the cam formation $5^b$ an indentation affording a shoulder $d^4$ is formed below the cam, wherein the lever $d^3$ may be seated in contact with said shoulder, which will retain the handle-lever in a position for retraction of the bolt $d$ until said lever is rocked away from the lug and the stress of the spring d' is permitted to press the bolt inward. It will be seen that the bolt d when engaged within any one of the grooves e will be adapted for holding the shaft 7 at a desired point of vertical adjustment and at the same time permit the shaft and parts it sustains on its portion 7ª to be freely rotated in either direction. In a tapped perforation formed in the wall of the boss b a set-screw b' is inserted, having a suitable head on its outer end for convenient manipulation, and, as shown in Fig. 1, the flat inner end of the set-screw b' may be forcibly impinged upon the shaft 7 for the retention of said shaft at a desired point of elevation in the boss b.

Upon the portion of the shaft 7 that extends below the head-plate 5 a runner-box or retaining member 8 is loosely mounted and preferably held at any desired point thereon by the following means: In the side of the runner-box 8 a tapped hole is formed that receives the set-screw g, which may be normally adjusted by means of a head on the outer end of the set-screw. In the bore of the box 8 a vertical channel is formed, wherein the clamping-plate g' is embedded and held from release by bending short flanges on its ends which bear upon respective upper and lower sides of the runner-box, and, as indicated in Figs. 1 and 3, the clamping-plate g' is located opposite the inner end of the set-screw g, so that by manipulation of said screw-bolt in a proper direction the plate g' may be forced against the shaft 7, and thus clamp the runner-box thereon. At an equal distance from the head-plate 5 a clip-band h is secured upon a respective tripod-leg 6, and between the runner-box 8 and clip-bands h the three similar connecting-rods 9 are extended, having their upper ends pivoted at equal distances apart upon the runner-box and their lower ends loosely secured upon the clip-bands, as best shown in Fig. 3. It will be seen that the upward sliding movement of the runner-box 8 will fold the legs 6 toward each other, and such an adjustment may be secured by means of the set-screw g, the release of the set-screw and downward-sliding adjustment of the runner-box serving to spread apart the legs 6, as may be desired, the box being held at a desired point by screwing the point of the set-screw against the clamping-plate g', as already described. It will furthermore be apparent that if the boss b is released from the shaft 7 by a proper adjustment of the locking-bolt d and the set-screw b the legs 6 may be moved outward or inward any desired degree by simply taking hold of the head-plate 5 and lowering or elevating it, as occasion may require.

Upon the flat portion 7ª of the shaft 7, which extends above the boss b, a segment-plate 10 is pivoted, the pivot-bolt i being at the radial center of an arched slot k, which may be provided with a series of gear-teeth k' along one curved edge, as shown in Fig. 1, or said edge may be left smooth, as appears in Figs. 5 and 6 at x, wherein the segment-plate is designated by the reference-character 10ª. Centrally from the upper edge of the segment-plate 10 and at a right angle thereto a flat plate-like arm 11 is projected, having a suitable width to afford support for a segment-plate 12, that is shown of less size than the segment-plate 10, but otherwise is similar thereto, having a series of teeth m' formed along a curved edge that defines one side of the arched slot m therein. The segment-plate 12 is preferably formed integral with a base-plate or carrier 13, that projects laterally from the upper portion of said segment-plate at a right angle thereto, as is indicated in Figs. 1 and 4. At a point in the upper part of the segment-plate 12 and in the radial center of the arched slot m a perforation n is formed, that receives the pivot-bolt n', which is inserted through a similar perforation in the arm 11, and upon the threaded portion of the headed pivot-bolt n' a nut n² is screwed, which loosely secures the segment-plate 12 upon the side of said arm 11, as is shown in Fig. 1.

The base-plate 13 is of a suitable area to afford stable support for the box-like body of a camera A when the latter is secured thereon, which attachment is effected by means of a clamping-screw o, which passes loosely up through the base-plate and screws into a perforation in the bottom of the camera box or body. A small pinion m² is provided with a roughened head m³ on one end and a cylindrical bolt extension m⁴ on the opposite end, said bolt having a suitable thread formed on it projecting beyond the upright arm 11, through a perforation in which the bolt-body is inserted after the pinion m² is engaged within the slot m and is meshed with the teeth m'. Upon the bolt-body m⁴ a nut m⁵ is screwed, the nut having a handle-lever m⁶ formed on it, which enables a clamping adjustment of the nut to be produced by a rotatable adjustment of the handle-lever in a proper direction. It will be seen that if the nut m⁵ is slackened the pinion m² may be rotated a proper degree to rock the base-plate 13 for a corresponding adjustment of the camera.

The segment-plate 10, that is provided with teeth k' in its arched slot k, is adapted to receive rocking motion in either direction on the pivot i by provision of a small pinion r, that is formed on a cylindrical shaft or bolt k², journaled in a perforation in the flattened shaft extension 7ª and projected therethrough a suitable distance. Upon the other end of the pinion r a headed enlargement k³ is formed, which affords a shoulder for contact upon the segment-plate 10 and provides means for manually turning the pinion in either direction. The portion of the bolt k² that extends through the shaft extension 7ª is threaded and receives the nut $k^4$, which is formed on one end of a handle-lever $k^5$, and it will be seen that if the nut $k^4$ is slackened by a proper movement of the handle $k^5$ a manual adjustment of the pinion may be effected by means of the head $k^3$, so as to rock the segment 10 in either direction in a vertical plane at a right angle to or intersecting the vertical plane in which the arched segment-plate 12 is held and adapted to receive rocking adjustment.

It will be obvious that the provision of the handle-levers $m^6$ and $k^5$ to operate the nuts $m^5$ and $k^4$, respectively, is very advantageous, as it enables the quick and reliable clamped securing of the arched segment-plates 10 12 at any point of rocked adjustment given thereto. It will also be seen that there is coöperation between the means just described for inclining the camera A at any desired angle in two vertical planes at right angles to each other and the means for elevating, lowering, or turning the camera around on the tripod that supports it, as by the latter-mentioned provision a practical adjustment in every direction may be produced at will and the camera be secured at any adjustment given to it by the improved adjustable support.

In Figs. 5 and 6 the segment-plate $10^a$ shown is devoid of teeth in the slot $s$, that is in other respects similar to the slot $k$ in the segment-plate 10, said segment-plate $10^a$ receiving pivotal support upon the flat upward extension $7^a$ of the shaft 7 by a pivot-bolt $t$, this pivot-bolt representing the radial center of the arched slot $s$. A clamping-bolt $u$, having a lever-handle $u'$ formed or secured on one end, is threaded upon the opposite end that screws into a tapped hole in the flat upper extension of the shaft 7 after passing through the arched slot $s$. It will be seen that by rocking the lever-handle $u'$ in one direction the segment-plate $10^a$ will be loosened from the support $7^a$, so that the segment-plate may be rocked more or less in either direction, as may be desired. Then an opposite rocking movement of the lever-handle will screw the threaded end of the clamping-bolt $u$ into the part $7^a$ of the shaft 7 sufficiently to bind the segment-plate $10^a$ thereon and hold it as adjusted until another adjustment is required. Obviously either means may be employed and serve efficiently for the retention of the segment-plates 10 or $10^a$ at any point of rocked adjustment, this slight change in construction being equivalent to that hereinbefore described for securing the segment-plates on their supports.

It will be observed that as the legs 6 of the tripod are all moved an equal degree the provision of the two arched segment-plates 10 12 and their means for clamping adjustment at a desired angle in planes at right angles to each other compensates for any deviation from a perpendicular position, which may be had by the tripod if it is stood upon a side-hill or upon uneven ground at a selected point for taking a picture with the camera.

Slight changes in minor details of the device may be resorted to within the scope of the invention as defined by the claims, as such changes may be regarded as the equivalents of the constructive details herein shown and described.

Having thus described my invention, I claim as new and desire to secure by Letters Patent—

1. The combination with a shaft, of a head and a retaining member movable relatively thereto, and legs pivotally connected with the head and retaining member.

2. The combination with a shaft, of a head and a retaining member movable relatively thereto, legs pivotally connected with the head and retaining member, and means for securing the retaining member to the shaft.

3. The combination with a shaft, of a head and a retaining member movable relatively thereto, legs pivotally connected with the head and retaining member, and independent means for securing the head and retaining member to the shaft.

4. The combination with a shaft, of a head and a runner-box movable relatively thereto, and connecting-rods pivoted to the legs and to the runner-box.

5. The combination with a shaft, of a head and a runner-box movable relatively thereto, connecting-rods pivoted to the legs and to the runner-box, and set-screws threaded through the head and runner-box and exerting their pressure against the shaft.

6. The combination with a grooved shaft, of a head and retaining member movable relatively thereto, legs pivotally connected with the head and retaining member, and means carried by the head for coacting with the grooves.

7. A support comprising a head, legs pivoted to the head, a member movable through and rotatable in the head, a carrier mounted upon the movable member, and interposed means for adjusting the carrier on the movable member in intersecting planes.

8. A support comprising a head, legs pivoted to the head, a shaft movable through and rotatable in the head, and a carrier pivotally mounted upon the shaft to swing in intersecting planes.

9. A support comprising a head, legs pivoted to the head, a shaft movable through and rotatable in the head, a retaining member mounted upon the shaft, connectors between the legs and retaining member, a carrier mounted upon the shaft, and means for adjusting the carrier in intersecting planes.

10. A support comprising a head, legs pivoted to the head, a shaft movable through and rotatable in the head, a retaining member mounted upon the shaft, means for securing the head and retaining member upon the shaft, connectors between the legs and retaining member, a carrier mounted upon the shaft, and means for adjusting the carrier in intersecting planes.

11. A support for cameras and other articles, comprising a head, hinged legs supporting the head, a member having rotary and vertical movement relatively to said head, and devices carried by said head for establishing connection between the said member and the camera or other article to be supported, said devices having adjustment in two vertical planes at about right angles to each other.

12. A support for cameras and other articles, comprising a head, hinged legs supporting the head, a member having rotary and vertical movement relatively to said head, devices carried by said head for establishing connection between the said member and the camera or other article to be supported, said devices having adjustment in two vertical planes at about right angles to each other, and means for preventing said movements of said member.

13. A support for cameras and other articles, comprising a head, hinged legs for the head, connections between the several legs, a member having vertical and rotary movement relatively to said head and said connections, and devices carried by said member for holding the camera or other article, said devices including means adjustable in two directions, at approximately right angles to each other.

14. A support for cameras and other articles, comprising a head, hinged legs for the head, connections between the legs, a member having vertical and rotary movement relatively to said head, means for establishing a fixed relation between the said leg connections and the said member, and devices carried by said member for holding the camera or other article to be supported, said devices including means adjustable in two directions at approximately right angles.

15. The combination with a head, of a shaft movable therein, a member mounted to swing upon the shaft, a second member mounted to swing upon the first member at an angle thereto, and a carrier secured to the second member.

16. The combination with a head, of a shaft carried thereby, a segment-plate pivotally mounted upon the shaft, and a carrier supported upon the segment-plate.

17. A support for a camera or the like, embodying two segmental members disposed one above the other in different upright planes, each member having an arched slot therein and pivoted on a support at the radial center of a respective slot, and means for holding each segmental member at a desired point of adjustment.

18. A support for a camera or the like, embodying two segmental plate-like members disposed one above the other in different upright planes, each member having an arched slot, and pivoted on a support at the radial center of a respective slot, said slots each having a series of teeth on one edge thereof, a pinion held to rotate in mesh with respective series of teeth, means for turning each pinion, and means for holding the pinions from turning.

19. A support for a camera or the like, embodying a legged head-plate, a shaft slidable in an opening in the head-plate, an apertured running-box loosely mounted on the shaft, a gib-plate held in the aperture of the box, and a set-screw bearing on the gib-plate for clamping the box upon the shaft.

20. In a camera-support, means for releasably securing the head-plate of a tripod in engagement with a grooved camera-supporting shaft, comprising a spring-pressed locking-bolt held to slide upon the head-plate so as to engage a groove in the shaft, and means for retracting the bolt against stress of the spring.

21. In a camera-support, means for releasably securing the head-plate of a tripod in engagement with an upright multiple-grooved camera-supporting shaft, comprising a spring-pressed locking-bolt held to slide upon the head-plate so as to engage either groove in said shaft, a cam formation on the head-plate, and a lever extended from the bolt for engagement with the cam and retracting said bolt against stress of the spring.

22. In a camera-support, means for releasably securing the head-plate of a tripod in engagement with an upright multiple-grooved camera-supporting shaft, comprising a locking-bolt held to slide upon the head-plate so as to engage one end in either groove in the shaft, a coiled spring mounted on the bolt and adapted to press said bolt toward the shaft, a transverse handle on the other end of the bolt, and a cam formation on the head-plate which the handle will ride upon when rocked laterally and retract the bolt.

23. In a camera-supporting tripod comprising legs hinged upon a head-plate, an upright shaft movable in the head-plate, a runner-box mounted on the shaft that loosely passes through an opening in said runner-box, stretcher-rods jointed at the ends on the runner-box and legs, and means for holding the runner-box secured on the shaft, comprising a gib-plate held loosely in a channel formed in the opening and held therein, and a set-screw adapted to press upon the plate for clamping it against the shaft.

24. A camera-support comprising a tripod, a device whereon the camera is mounted and held adjustable in two vertical planes at right angles to each other, means for vertically adjusting, rotating and holding said device on a tripod, and coacting means for spreading or folding the legs of the tripod.

25. A camera-support comprising a tripod, a shaft adjustable for height on the head of the tripod, two segment-plates held to rock at right angles and one above the other on the upper portion of the shaft, a base-plate on the upper segment-plate, means for detachably holding a camera on the base-plate, and means for releasably securing the segment-plates at a desired point of rocked adjustment.

26. In a camera-support, a tripod comprising a head-plate having a boss thereon that is axially perforated, a depending shaft adjustable in the perforation, legs pivoted by upper ends on the head-plate, a runner-box adjustable on the shaft, connecting-rods held to rock at their upper ends on the runner-box, and means for loosely securing the lower ends of said rods upon the tripod-legs.

27. In a camera-support, a tripod comprising a head-plate, an upright axially-perforated boss thereon, a grooved shaft slidable in the boss, a locking-bolt held to slide at one side of the boss and insertible in either groove, means for retracting and holding the bolt retracted, legs held to swing by one end on the head-plate, a runner-box slidable and securable on the shaft, clip-bands on the legs, and connecting-rods pivoted at their upper ends on the runner-box, and at their lower ends upon the clip-bands.

28. A camera-support, comprising a tripod having a head-plate and an axially-perforated boss thereon, a grooved shaft slidable in the boss, a spring-pressed locking-bolt supported on the boss and working laterally therethrough so as to engage its inner end in either groove in the shaft, means for retracting and holding the bolt retracted, legs pivoted by upper ends on the head-plate, a runner-box on the shaft slidable below the head-plate, a set-screw bolt in the runner-box which by adjustment adapts the shaft for holding the box stationary, clip-bands on the legs equally spaced from the head-plate, connecting-rods of equal length pivoted at their upper ends on the runner-box at spaced intervals, and at their lower ends pivoted upon the clip-bands, a segment-plate having an arched slot, and pivoted at the radial center of said slot on an upward flattened extension of the grooved shaft, an upwardly-projected arm on the segment-plate disposed at a right angle thereto, means engaging the arched slot and the arm for adjustably securing the segment-plate at a desired point of rocked adjustment, a similarly-slotted segment-plate pivoted on the upwardly-projected arm at the radial center of the slot, means engaging said slot and the arm for securing said segment-plate rocked at a desired inclination, a base-plate extended laterally from the upper segment-plate, and a set-screw in the base-plate for holding a camera thereon.

29. In a camera-support, the combination with a tripod having a head-plate, an upright perforated boss thereon, a spring-pressed locking-bolt on one side of the boss, and a grooved shaft slidable in the boss and adapted to receive the bolt in any groove therein, said shaft having a flattened upward extension, of a segment-plate having an arched slot and pivoted at the radial center of said slot on the upward extension of the shaft, a clamping-bolt passing through the slot and screwing into a tapped hole in the shaft extension, said clamping-bolt having a lever-handle on one end, an upwardly-extended arm on this segment-plate, said arm being disposed in a plane at a right angle to the plane of the segment-plate it is formed on, another segment-plate having an arched slot and pivoted upon the arm at the radial center of the arched slot in said plate, means for adjustably securing the upper segment-plate upon the arm, a base-plate projected laterally and horizontally on the upper portion of the upper segment-plate, and a set-screw in said base-plate for holding a camera thereon.

In testimony whereof I have signed my name to this specification in the presence of two subscribing witnesses.

MARTIN GRAF.

Witnesses:
F. W. HANAFORD,
EVERARD BOLTON MARSHALL.